(No Model.) 2 Sheets—Sheet 1.

L. H. A. DRUEDING.
DEVICE FOR LIGHTING GAS BURNERS.

No. 566,746. Patented Sept. 1, 1896.

Witnesses
John H. Holly
John C. Wilson

Inventor
L. H. A. Drueding,
by Whitman & Wilkinson
Attorneys.

(No Model.) 2 Sheets—Sheet 2.

L. H. A. DRUEDING.
DEVICE FOR LIGHTING GAS BURNERS.

No. 566,746. Patented Sept. 1, 1896.

UNITED STATES PATENT OFFICE.

LEONARD H. A. DRUEDING, OF NEW ORLEANS, LOUISIANA.

DEVICE FOR LIGHTING GAS-BURNERS.

SPECIFICATION forming part of Letters Patent No. 566,746, dated September 1, 1896.

Application filed November 11, 1895. Serial No. 568,591. (No model.)

*To all whom it may concern:*

Be it known that I, LEONARD H. A. DRUEDING, a citizen of the United States, residing at New Orleans, in the parish of Orleans and State of Louisiana, have invented certain new and useful Improvements in Devices for Lighting Gas-Burners; and I do hereby declare the following to be a full, clear, and exact description of the invention, such as will enable others skilled in the art to which it appertains to make and use the same.

My invention relates to improvements in devices for facilitating the lighting of gas-burners; and it consists of the improvements hereinafter described and claimed.

My invention will be understood by reference to the accompanying drawings, wherein the same parts are indicated by the same letters throughout the several views.

Figure 1:
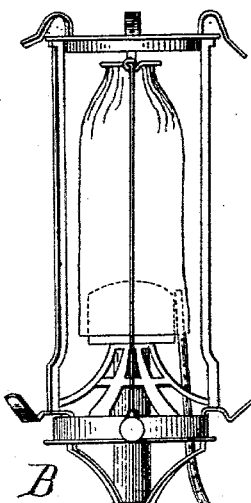
Figure 4:
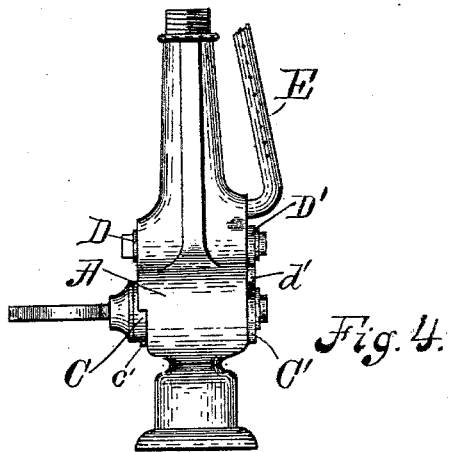
Figure 3:
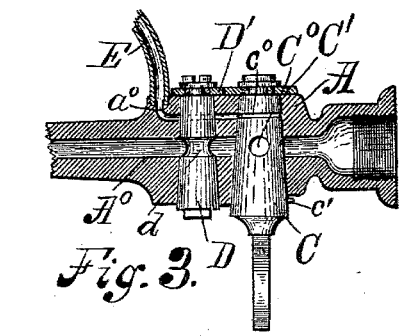
Figure 2:
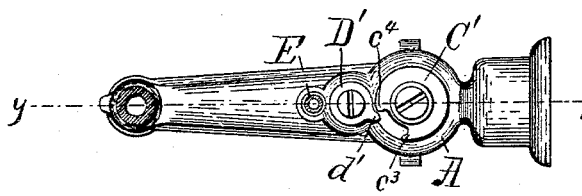
Figures 5, 6:
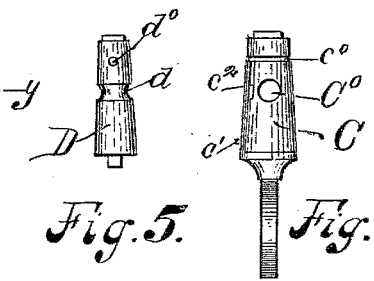
Figure 7:
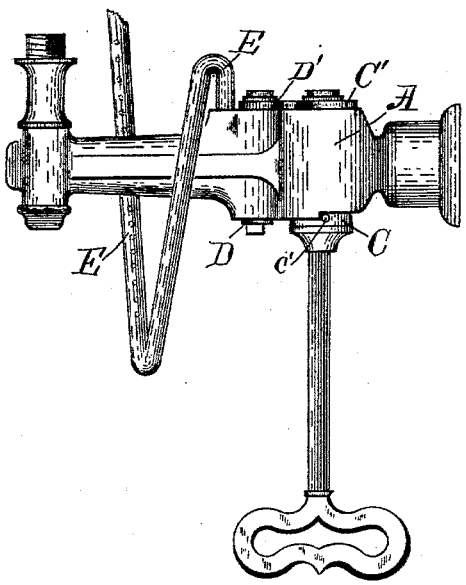
Figure 8:
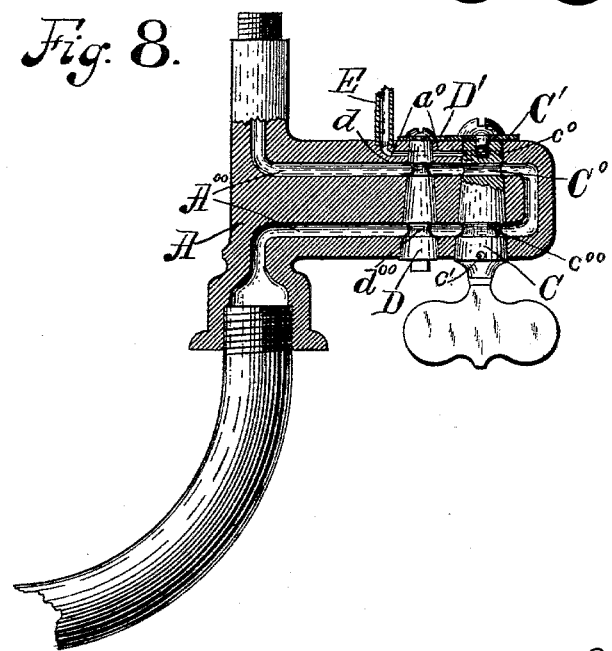

Figure 1 is a side elevation of a gas-plug casing and burner provided with my invention. Fig. 2 is a top plan view of Fig. 1, parts being cut away along the line $x\ x$ in said figure. Fig. 3 is a vertical section taken on the line $y\ y$ of Fig. 2 and shows the relative positions of the plugs in the casing when the main plug is in the closed position. Fig. 4 is a side elevation of a modified form of plug-casing, which occupies a vertical position instead of a horizontal position, as shown in Fig. 1. Fig. 5 is a detail view of the secondary plug, looking at the same in the direction of the passage therethrough. Fig. 6 is a detail view of the main plug as seen from the opposite side in Fig. 3 and showing the grooves therein. Fig. 7 is a side elevation of a plug-casing of the form shown in Fig. 1, having the main plug elongated and the perforated side tube bent downward some distance in order to bring the place for lighting the gas within easy reach in the case of high chandeliers or brackets; and Fig. 8 is a still further modification of the form of plug-casing shown in Figs. 1, 2, and 3.

A represents the plug-casing, which is provided with the main passage $A^0$ and smaller side passage $a^0$ therein.

B represents the burner, which may be of any suitable or desired construction, but which for the sake of illustration in the drawings is represented as a Welsbach burner.

C represents the main plug for turning on and off the gas to the burner, and this main plug is provided with the main passage $C^0$, as usual, and also with the annular passage or groove $c^0$ near its top and the vertical passage or groove $c^2$, which communicates with the annular groove $c^0$ and extends downward slightly to one side of the main passage $C^0$. A stud or pin $c'$ is provided on the plug C, which strikes against a shoulder on the casing when the plug is turned fully to either the open or closed position, and thus arrests the further motion of the plug in that direction. For the purposes of my invention the main plug should only be allowed to turn through an angle of ninety degrees.

The annular groove $c^0$ in the main plug is arranged to come exactly opposite the side passage $a^0$ in the casing when the plug is in position, and thus to at all times be in communication therewith. The vertical groove $c^2$ in the plug C, as shown in Fig. 6, is arranged to communicate with the main passage in the casing at a point when the main plug has been turned almost but not quite to the open position, thus allowing gas to enter said vertical groove $c^2$ and pass from thence to the annular groove $c^0$, from whence it will flow into the side passage $a^0$ in the casing; but for regulating this flow of gas through the side passage when the said vertical groove communicates with the main passage in the casing, so that gas will not flow through said side passage except while turning the main plug to the open position, I have provided the hereinafter-described devices, which will close this side passage except at the instant when in turning on the gas it is desired to light the same.

D represents a smaller or secondary plug which fits into a chamber in the casing provided therefor alongside of the main plug. This secondary plug is cut away, as at $d$, where it passes through the main passage in the casing to allow of the free passage of the gas through the main passage in the casing when the main plug is open. This secondary plug is also provided with a passage $d^0$ therethrough, which is arranged to be turned into and out of line with the side passage $a^0$ in the casing and thus open or close the said passage. This secondary plug is operated by the movement of the main plug as follows:

C' represents a disk or washer which fits upon a squared portion on the top of the main plug and turns with said plug. This washer is held firmly in position by means of a suitable screw, as shown, and is cut away along a portion of its periphery, as shown in Fig. 2, to form the two shoulders $c^3$ and $c^4$. A disk or washer D' is similarly mounted upon the top of the secondary plug D, and this washer D' is provided at a point on its periphery with a stud or projection $d'$. When the main plug is turned to the closed position, as shown in Figs. 2 and 3, the shoulder $c^4$ on the washer C', which turns with the main plug, will come into contact with the side of the stud or lug $d'$ on the washer D', which, being rigidly mounted upon the secondary plug, will cause the said secondary plug to turn through the proper angle to open the passage through the side channel $a^0$ in the casing. Now when the main plug is turned toward the open position the distance between the shoulders $c^3$ and $c^4$ on the washer C' will allow the said plug to be turned through a sufficient angle to bring the vertical groove $c^2$ on the said plug into communication with the main channel in the casing, which will allow the gas to flow through said vertical passage $c^2$ into the annular passage $c^0$ and thence through the side passage $a^0$ in the casing and the passage $d^0$ in the secondary plug, which is always open when the main plug is closed and is not closed until the main plug is open, and the gas will then flow upward into the perforated side tube E, where it is ignited near the bottom of said tube, and the flame will be communicated from hole to hole to the tip of the side tube E. Now, the gas being lighted in the side tube and burning at its top, which is very near the tip of the burner, if the main plug be further turned the shoulder $c^3$ on the washer C', which has come into contact with the stud $d'$ on the washer D', will push this stud $d'$ around as long as the movement of the main plug continues toward the open position, thus turning the secondary plug through a sufficient angle to throw the passage $d^0$ therethrough out of line with the side passage $a^0$ in the casing, and so close the side passage.

The vertical groove $c^2$ is so arranged relative to the main passage $C^0$ in the main plug that the gas will not be turned off from the side passage until the main plug has been opened to very nearly, if not quite, its full extent, thus allowing sufficient gas to escape through the main passage to the tip of the burner and there become ignited by the flame at the tip of the side tube before the gas in the side tube is shut off. When the main plug has been entirely opened, the side passage will be closed and will remain so until the main plug is turned toward the closed position again. During this movement the shoulder $c^4$ on the washer C' will not come into contact with the stud $d'$ on the washer D' until the vertical groove $c^2$ on the main plug has been turned past the main passage in the casing and the possibility of any gas entering said vertical groove prevented, when the further movement of the main plug toward the closed position will cause the shoulder $c^4$ on the washer C' to push the stud $d'$ around and open the side passage in readiness for lighting the gas again.

The form of plugs and the arrangement of the grooves and passages therein, as also the arrangement of the passages in the casing, are the same in Figs. 1 to 7, inclusive. In Fig. 4 the casing occupies a vertical position, and consequently the position of the side tube is slightly modified. In Fig. 7 the key for turning the plug is elongated and the side tube has been brought down some distance to bring the point for lighting within easier reach, and then continued upward to the tip of the burner. In Fig. 8, however, a modified form of casing is shown, and the grooves in the plugs are also modified somewhat. In this figure the burner will occupy a vertical position, and be immediately above the inlet-pipe of the chandelier, and the valve-casing will be off to one side. In order to allow the passage of the gas through the main passage $A^{00}$ in this form of casing, the main plug, as well as the secondary plug, have each an annular groove cut around them, as shown by $c^{00}$ and $d^{00}$ in the said figure. In all other respects the arrangement of grooves and passages on these plugs are the same as with the remaining figures of the drawings.

The lower end of the side tube E fits snugly into the casing A, and may be either permanently fixed therein or made removable.

The position of the casing and the plugs may be varied to suit many different forms of burners, and many other modifications of the herein-described devices might be made without departing from the spirit of my invention.

Having thus described my invention, what I claim, and desire to secure by Letters Patent of the United States, is—

1. In a gas-fixture, the combination with the valve-casing provided with the main passage therethrough and a smaller side passage therein; the main valve-plug fitting in said casing and provided with the main opening therethrough and also grooves therein through which gas may escape from the said main passage in the casing to the said side passage at a certain point during the movement of the said main plug; of a secondary plug also working in said casing and adapted to open and close said side passage, and means connected with said main plug for turning said secondary plug to open and close said side passage, substantially as described.

2. In a gas-fixture, the combination with the valve-casing provided with the main passage therethrough and a smaller side passage therein; the main valve-plug fitting in said casing and provided with the main opening therethrough and also grooves therein through which gas may escape from the said main passage in the casing to the said side passage at a certain point during the movement of the said main plug; of a secondary plug also working in said casing and adapted to open and close said side passage; a washer or disk mounted upon said secondary plug and having a stud or projection upon its periphery, and a washer mounted upon said main plug and provided with a pair of shoulders adapted to engage said stud or projection and thus turn said secondary plug to open or close said side passage, substantially as described.

3. In a device of the character described, the combination with a gas-burner of the valve-casing provided with the main passage therethrough and a smaller side passage therein; the main plug fitting in said casing, and having the main passage therethrough and provided with a groove or passage adapted to communicate with the main passage in the casing at a point between the open and closed positions of the plug, and also provided with a groove which at all times communicates with said groove in the plug and with the side passage in the casing; a perforated tube leading from the outer end of said side passage in the casing to the tip of the burner; a secondary plug also fitting in said casing, having a passage therethrough, and adapted to open and close the said side passage, and means operated by said main plug for turning said secondary plug through the proper angle to open or close the side passage, substantially as and for the purposes described.

4. In a device of the character described, the combination with a gas-burner, of the valve-casing provided with the main passage therethrough and a smaller side passage therein; the main plug fitting in said casing, and having the main passage therethrough, and provided also with a vertical groove therein to one side of the main passage, and also provided with an annular groove communicating with said vertical groove in the plug and said side passage in the casing; a perforated tube leading from the outer end of said side passage in the casing to the tip of the burner; a secondary plug also fitting in said casing, and having a passage therethrough adapted to be turned into and out of line with said side passage in the casing, a washer having a stud or projection upon its periphery mounted upon said secondary plug, and a washer provided with a pair of shoulders adapted to engage said stud or projection, mounted upon said main plug, substantially as and for the purposes described.

5. In a device of the character described, the combination with the valve-casing having the main passage therethrough and a smaller side passage therein, and a main plug adapted to be turned by the hand and to open and close the main passage, and also to admit gas to and to shut gas off from said side passage; of a secondary plug operated by said main plug during a portion of its movement, and adapted to open and close said side passage, substantially as and for the purposes described.

In testimony whereof I affix my signature in presence of two witnesses.

LEONARD H. A. DRUEDING.

Witnesses:
J. R. LOONNIS,
FRED. T. GREVE.